United States Patent
Kim et al.

(10) Patent No.: US 8,937,285 B2
(45) Date of Patent: Jan. 20, 2015

(54) METHODS AND SYSTEMS FOR SIGNAL COMMUNICATION IN GAMMA RAY DETECTORS

(75) Inventors: Chang Lyong Kim, Brookfield, WI (US); David Leo McDaniel, Dousman, WI (US); James Lindgren Malaney, Brookfield, WI (US); William Todd Peterson, Sussex, WI (US); Gary V. McBroom, Dousman, WI (US)

(73) Assignee: General Electric Company, Schenectady, NY (US)

( * ) Notice: Subject to any disclaimer, the term of this patent is extended or adjusted under 35 U.S.C. 154(b) by 201 days.

(21) Appl. No.: 13/526,130

(22) Filed: Jun. 18, 2012

(65) Prior Publication Data

US 2013/0334428 A1 Dec. 19, 2013

(51) Int. Cl.
*G01T 1/20* (2006.01)

(52) U.S. Cl.
USPC ........................................ 250/361 R; 250/362

(58) Field of Classification Search
CPC ..... G01T 1/2018; G01T 1/241; G01T 1/1603; G01T 1/161; G01T 1/169; G01T 1/20; G01T 1/208; G01T 1/24; G01T 1/248; G01T 1/249; G01T 1/2928; G01T 1/2985; G01T 3/008; G01T 3/06; G01T 7/08; A61B 6/03; A61B 6/037; A61B 6/00; A61B 5/055; A61B 6/4233; A61B 19/00; A61B 6/06; A61B 6/502; A61B 6/5247; A61B 10/0041; A61B 10/0233; A61B 2017/3405; A61B 2576/00; A61B 5/00; A61B 5/004; A61B 5/0046; H01L 27/14636; H01L 27/14663; H01L 27/1446; H01L 27/14658; H01L 27/14698; H01L 31/022408; H01L 31/03529; H01L 31/103; H01L 31/105; H01L 31/18; H04N 7/18; H04N 13/0203; H04N 5/23219
USPC ........... 250/361 R, 366, 367, 363.03, 363.04, 250/394, 362, 370.09, 370.11
See application file for complete search history.

(56) References Cited

U.S. PATENT DOCUMENTS

| | | | |
|---|---|---|---|
| 5,460,531 A * | 10/1995 | Vivio | 439/70 |
| 7,659,519 B1 | 2/2010 | Zheng et al. | |
| 2008/0090338 A1 | 4/2008 | Tredwell et al. | |
| 2008/0156993 A1* | 7/2008 | Weinberg et al. | 250/363.03 |
| 2011/0212555 A1 | 9/2011 | Tredwell et al. | |
| 2012/0068050 A1* | 3/2012 | Mazzillo et al. | 250/208.1 |
| 2012/0133054 A1 | 5/2012 | Tkaczyk et al. | |

OTHER PUBLICATIONS

McGraw-Hill Dictionary of Scientific & Technical Terms, 6E, p. 2257, Copyright © 2003 by The McGraw-Hill Companies, Inc.*

* cited by examiner

*Primary Examiner* — Mark R Gaworecki
(74) *Attorney, Agent, or Firm* — Dean D. Small; The Small Patent Law Group

(57) ABSTRACT

Methods and systems for signal communication in gamma ray detectors are provided. One gamma ray detector includes a scintillator block having a plurality of scintillator crystals and a plurality of light sensors coupled to the scintillator crystals and having a plurality of microcells. Each of the plurality of light sensors has a first set of signal traces connected to the microcells and a second set of signal traces connected along the first set of signal traces and together forming a signal path to a summing signal trace. Each of the plurality of light sensors also has a pin-out connected to the summing signal trace.

22 Claims, 5 Drawing Sheets

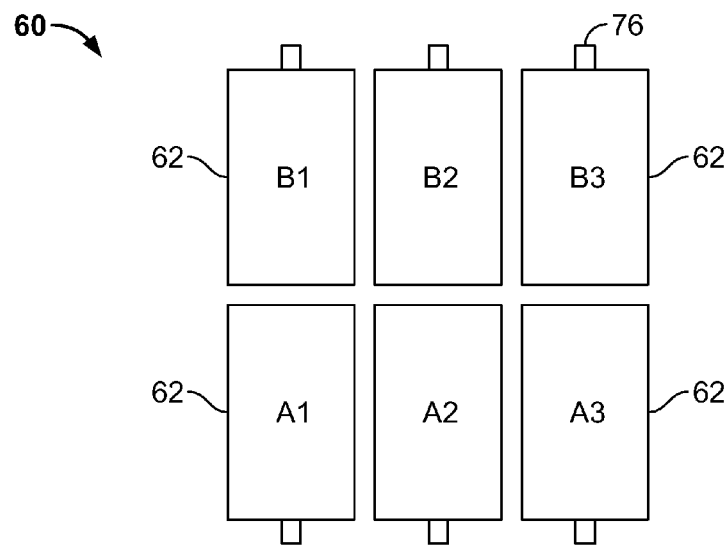
FIG. 3
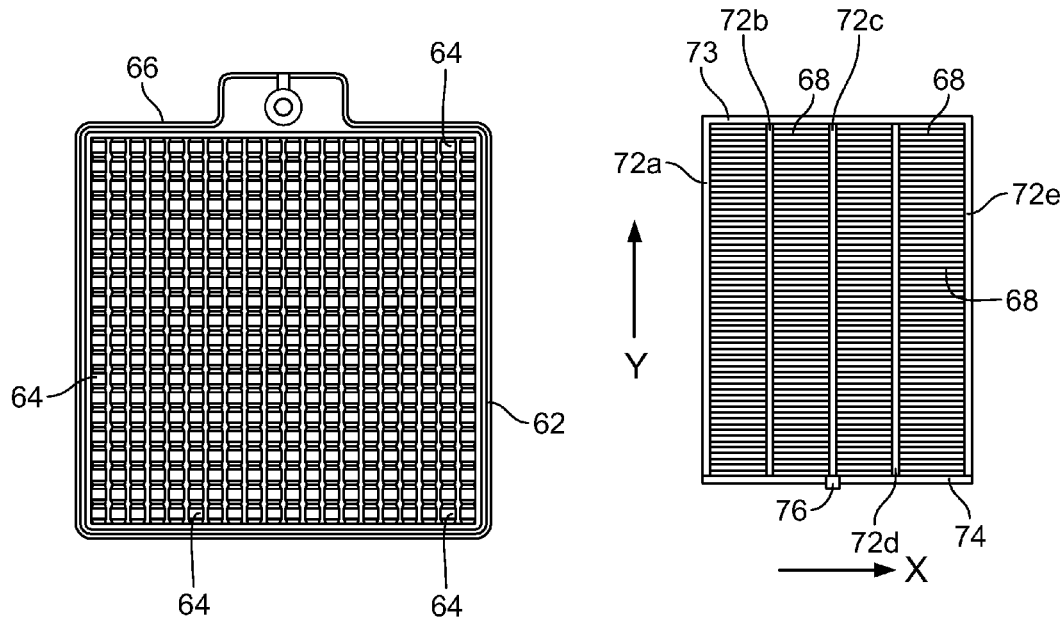
FIG. 4
FIG. 5

METHODS AND SYSTEMS FOR SIGNAL COMMUNICATION IN GAMMA RAY DETECTORS

BACKGROUND OF THE INVENTION

The subject matter disclosed herein relates generally to gamma ray detectors, and more particularly, to systems and methods for communicating signals in gamma ray detectors.

Gamma ray detectors may be used in different applications, such as in Positron Emission Tomography (PET) systems. PET systems perform nuclear medicine imaging that generates a three-dimensional image or picture of functional processes within a body. For example, a PET system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The annihilation photons are detected by detectors that are placed along the line of response on a detector ring. When these photons arrive and are detected at the detector elements at the same time, this is referred to as coincidence. An image is then generated based on the acquired image data that includes the annihilation photon detection information.

In silicon photomultiplier based PET detectors, in order to cover a large area for detection of gamma rays, a large number of small area silicon photomultipliers (e.g., 3×3 mm² or 4×4 mm² photomultiplier devices) are used. The large number of these photomultipliers increases the complexity of the devices, as well as the number of readout channels.

In order to reduce the number of channels, as well as the complexity of handling many small individual pixels (e.g., a one anode device or a one anode per pixel device), monolithic devices (e.g., a device with many pixels) having larger areas may be used, such as for PET-Magnetic Resonance (PET-MR) detectors. However, these monolithic devices have anode readout traces that cause cross-talk through inductive and capacitive electric coupling. Additionally, larger pixels exhibit a larger transit time spread due to size, as well as the location of the various signal summing points.

Thus, known architectures for signal communication in gamma ray detectors, particularly using solid state photomultipliers may not work satisfactorily and have complex controls.

BRIEF DESCRIPTION OF THE INVENTION

In one embodiment, a gamma ray detector is provided that includes a scintillator block having a plurality of scintillator crystals and a plurality of light sensors coupled to the scintillator crystals. Each of the plurality of light sensors includes a plurality of microcells. Each of the plurality of light sensors includes a first set of signal traces connected to the microcells and a second set of signal traces connected along the first set of signal traces and together forming a signal path to a summing signal trace. Each of the plurality of light sensors also includes a pin-out connected to the summing signal trace.

In another embodiment, a Position Emission Tomography (PET) system is provided that includes a plurality of gamma ray detector elements configured to acquire scan data, wherein the detector elements have scintillator crystals with a plurality of lights sensors. Each of the plurality of light sensors includes a plurality of microcells. Each of the plurality of light sensors has a first set of signal traces connected to the microcells and a second set of signal traces connected along the first set of signal traces and together forming a signal path to a summing signal trace. Each of the plurality of light sensors also includes a pin-out connected to the summing signal trace.

BRIEF DESCRIPTION OF THE DRAWINGS

FIG. 3 is a schematic block diagram of Silicon photomultipliers (SIPMs) in accordance with an embodiment.

FIG. 4 is a diagram of an SIPM illustrating microcells.

FIG. 5 is a diagram illustrating a signal trace arrangement in accordance with an embodiment.

DETAILED DESCRIPTION OF THE INVENTION

Figure 1:
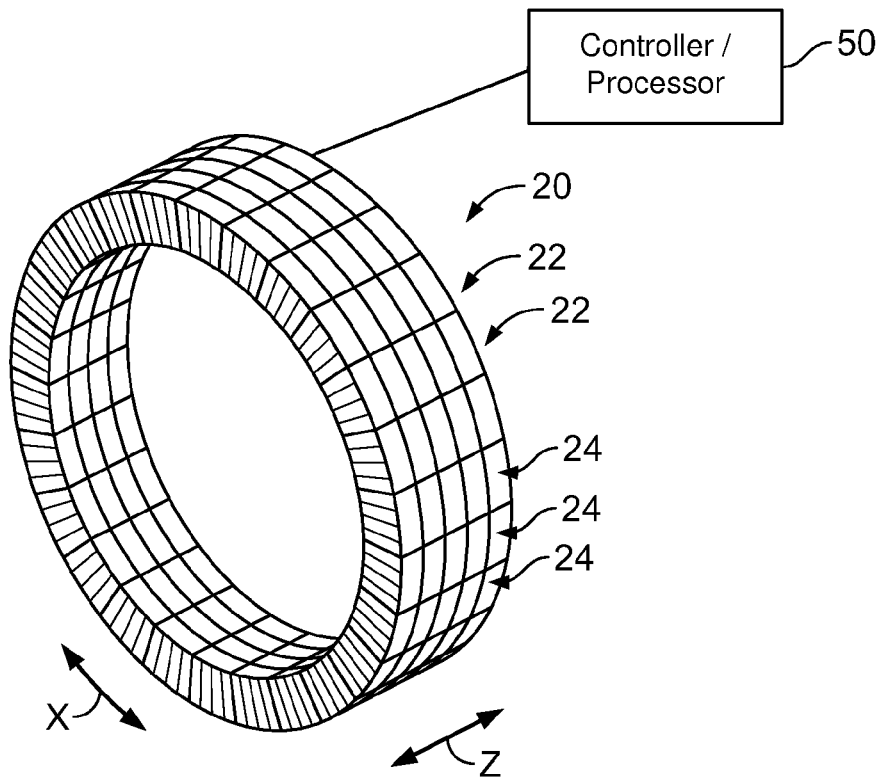
FIG. 1 is a perspective view of a positron emission tomography (PET) detector assembly in accordance with an embodiment.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide signal communication schemes and/or architectures for gamma ray detectors, particularly gamma ray detectors having Silicon photomultipliers (SIPMs). In particular, some embodiments provide different signal trace layouts or readout schemes for anode readout from the gamma ray detectors. One or more technical effects of various embodiments include timing optimization (transit time optimization), lower inductance and/or increased fill factors may be provided. The gamma ray detectors may be used, for example, in Positron Emission Tomography (PET) systems or other systems, such as a PET-Magnetic Resonance Imaging (PET-MRI) systems. However, the various embodiments may be used with gamma ray detectors in non-medical imaging systems or non-imaging systems as well.

Various embodiments may be used in combination with gamma ray detectors (also referred to herein as gamma detectors) in a PET system having a PET detector assembly 20 shown in perspective view in FIG. 1. However, it should be appreciated that the gamma detectors and various embodiments may be implemented in different types of imaging and non-imaging systems. In the illustrated embodiment, the PET detector assembly 20 is coupled to a controller/processor 50 that receives data or signals from the PET detector assembly 20 and may also provide control signals. The controller/processor 50 may receive gamma ray count data (e.g., coincidence count data) from a plurality of application specific integrated circuits (ASICs) connected to the PET detector assembly 20. Thus, the PET detector ring assembly 20 may be utilized to provide signals to the controller/processor 50.

In various embodiments, the PET detector assembly 20 includes a plurality of detector modules 22 that are arranged in a ring to form the PET detector ring assembly 20. Each detector module 22 is assembled from a plurality of detector units 24. Thus, a plurality of detector units 24 (also referred to as detector blocks) is assembled to form a single detector module 22, and a plurality of detector modules 22 is assembled to form the detector ring assembly 20. In one embodiment, the detector assembly 20 includes twenty-eight detector modules 22 that are coupled together such that the detector assembly 20 has a ring shape. In some embodiments, each detector module 22 includes twenty detector units 24 that are arranged in a 4×5 matrix. It should be realized that the quantity of detector modules 22 utilized to form the detector assembly 20 is exemplary, and that the detector assembly 20 may have more than or fewer than twenty-eight detector modules 22. Moreover, it should be realized that quantity of detector units 24 utilized to form each detector module 22 is exemplary, and that the detector module 22 may have more than or fewer than twenty detector units 24.

Figure 2:
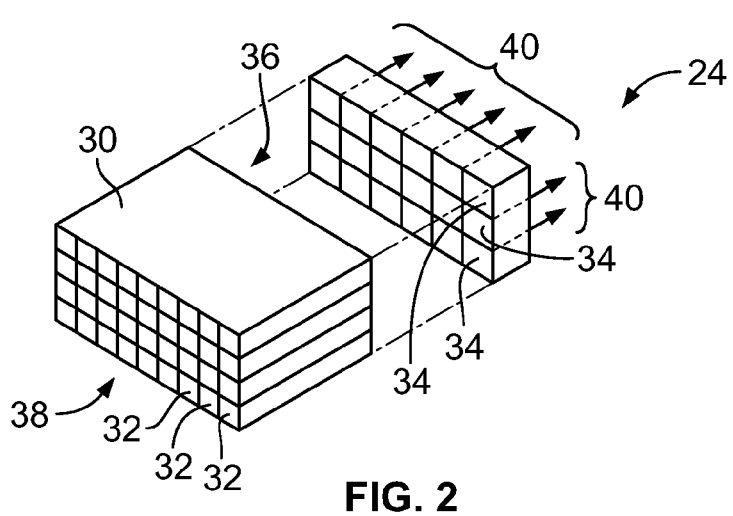
FIG. 2 is a perspective view of a detector unit formed in accordance with an embodiment.

FIG. 2 illustrates a single detector unit 24 comprising a plurality of scintillation crystals 32 that are impinged by the gamma rays and that may form a portion of the detector module 22 shown in FIG. 1. In various embodiments, the detector unit 24 includes a scintillator block 30 having the one or more scintillator crystals 32 that are arranged along an x-axis and a z-axis. In one embodiment, the scintillator block 30 has thirty-six crystals 32 that are arranged in a 4×9 matrix. However, it should be realized that the scintillator block 30 may have fewer than or more than thirty-six crystals 32, and that the crystals 32 may be arranged in a matrix of any suitable size. It also should be noted that the scintillator crystals 32 may be formed from any suitable material such as bismuth germinate (BGO), Cerium-doped Lutetium Yttrium Orthosilicate (LYSO) or Gadolinium Oxyorthosilicate (GSO), among others.

The detector unit 24 also includes a plurality of light sensors 34, illustrated as a plurality of photosensors, which may be any suitable photo-detectors that sense or detect light or other electromagnetic energy. In the illustrated embodiment, the light sensors 34 are Silicon photomultipliers (SIPMs). The plurality of light sensors 34 are coupled at an end of the scintillator block 30 opposite a detector face 38. The surfaces of the crystal block 30 not coupled to the light sensors 34 are covered with a reflective layer such as Teflon, TiO2 load Epoxy, or a spectral reflector. It should be noted that in some embodiments, a reflector or reflective material may be placed between some crystals in the block 30.

In various embodiments, the detector unit 24 has eighteen light sensors 34 on each end of the scintillator block 30 that are arranged in a 3×6 matrix. However, it should be realized that the detector unit 24 may have fewer than or more than eighteen light sensors 34 and that the light sensors 34 may be arranged in a matrix of any suitable size. For example, some embodiments include 36, 54 or 100 crystals 32 having corresponding light sensors 34 that are arranged in a 3×6 matrix, 6×6 matrix, 9×6 matrix or 10×10 matrix, respectively. It should be noted that in various embodiments, a one-to-one coupling between the light sensor 34 (e.g., a photosensor) and the crystal 32 is provided. However, in other embodiments a one-to-one coupling between the light sensor 34 (e.g., a photosensor) and the crystal 32 is not provided, such that there is a one-to-multiple coupling between the light sensor 34 and the crystal 32. Also, the light sensors 34 may have a different size or shape. In some embodiments, the light sensors 34 are larger than 3×3 mm$^2$. However, in other embodiments, larger or smaller light sensors 34 may be used, such as 4×6 mm$^2$ light sensors 34.

It should be noted that the crystals 32 utilized in an SIPM detector in some embodiments can be smaller than the crystals of the light sensors 34, as the area covered by an SIPM is smaller than the area covered by a light sensors 34. For example, a scintillation crystal area of about 4×4 cm$^2$ may include up to or more than 100 SSPMs.

In one embodiment, the light sensors 34 are avalanche photodiodes that are connected in parallel and operated above a breakdown voltage in a Geiger mode. For example, the light sensors 34 may be SIPMs in various embodiments that are configured as single photon sensitive devices formed from an avalanche photodiode array on a silicon substrate. However, it should be noted that the light sensors 34 may be any type of solid state light sensor, for example, any type of photodiode.

In operation, the scintillator crystals 32 convert the energy, deposited by a gamma ray impinging on the scintillator crystal 32, into visible (or near-UV) light photons. The photons are then converted to electrical analog signals by the light sensors 34. More specifically, when a gamma ray impinges on any one of the scintillators 32 in a detector unit 24, the scintillator detecting the gamma ray converts the energy of the gamma ray into visible light that is detected by the light sensors 34 in the detector unit 24. Thus, in the exemplary embodiment, each detector unit 24 is configured to output "n" analog signals 40.

The scintillator crystals 32 may form a rectangular matrix of crystal elements. Each scintillator crystal 32 may be rectangular or square in shape such that a compact array can be formed. Some gamma rays strike a scintillator crystal 32 with no scattering. i.e., the ray deposits all its energy in the scintillator crystals 32. Other gamma rays may strike an electron within the scintillator crystal 32 and deposit a fraction of energy there, and then impinge a proximate scintillator crystal 32. This phenomenon is referred to as a Compton scattering event. In the latter case the gamma ray energy is absorbed in both scintillator crystals 32.

Thus, the energy deposited in the detector unit 24 of FIG. 2 (i.e., energy incident on any of an M×N matrix of the scintillation crystals 26) is determined and read out by the light sensors 34. The energy in the light sensors 34 may be combined to determine the total incident energy. For example, anger logic may be used to determine the specific scintillation crystal 26 that was struck by the incident gamma ray.

Accordingly, detection by the ring(s) of detectors, namely the PET detector assembly 20 (shown in FIG. 1) is based on the principle that two photons detected in close temporal proximity (e.g., within less than about 7 nanoseconds (ns) by the two oppositely disposed detector units 24 in a single ring) are likely to have originated from a single annihilation event in the patient's body somewhere along a line that connects the two detectors. All of the coincidence events detected during an imaging session are recorded by the PET scanner as raw data. Such a simultaneous detection is termed a "coincidence." The coincidence data in PET imaging is reconstructed by a computer to produce cross-sectional images in the axial, sagittal and/or coronal planes, such as using the controller/processor 50.

The electron-positron decays cause the emission of two 511 keV gamma photons at almost 180 degrees apart. Accordingly, it is possible to localize the source along a straight line of coincidence (also referred to as a line of response or LOR) connecting the two detected gamma photons. In practice, the LOR has a finite width as the emitted photons are not exactly 180 degrees apart. It should be noted that if the resolving time of the detector units 24 (also referred to as the temporal window) is greater than about 1 ns, it is difficult to localize the location of the origin of the gamma rays to a segment of the LOR. If the timing resolution is better than about 1 ns, the event can be localized to a segment of the LOR. This localization process is referred to as time-of-flight (TOF) detection and is used by PET systems to determine the time difference between the detection of the photons. These systems, thus, reduce the length of the LOR segment of interest and more precisely determine the location of the origin of the gamma ray. As the timing resolution improves, the signal-to-noise ratio (SNR) of the image also improves, requiring fewer events to achieve the same image quality.

The raw data collected by a PET scanner using the PET detector assembly 20 in some embodiments includes a list of coincidence events representing near-simultaneous detection of annihilation photons by the pair of oppositely disposed detectors. Using statistics collected from the coincidence events, a set of simultaneous equations for the total activity of each portion of tissue along many LORs can be solved, and thus a map of radioactivities, as a function of location for portions of tissue, is constructed and displayed. The resulting map shows the tissues in which the molecular probe, for example, a radiopharmaceutical, has become concentrated and can be interpreted by a nuclear medicine physician or radiologist.

Various embodiments of signal communication schemes and/or architectures will now be described. It should be noted that while specific signal trace arrangements are described, modifications are contemplated. FIG. 3 illustrates an array 60 of SIPMs 62 (illustrated as a 2×3 array) in accordance with an embodiment and FIG. 4 shows a single one of the SIPMs 62. Each of the SIPMs 62 includes a separate anode and each of the SIPMs 62 are biased, namely, has a bias voltage applied thereto. As can be seen in FIG. 4, each of the SIPMs 62 (one is shown for simplicity of illustration) includes a plurality of microcells 64. In various embodiments each microcell 64 has dimensions of between about 25 micrometers (micros)×25 microns to about 100 microns×100 microns. However, larger or smaller microcells 64 may be provided. Accordingly, each SIPM 62 may include several thousand microcells 64, such as 4000 microcells 64 each having dimensions of 35 microns×35 microns or 50 microns×50 microns. It should be appreciated that more or less microcells 64 may be provided, such as 10,000 or more microcells 64. The microcells 64 may be connected in parallel in some embodiments in a PN junction (avalanche) arrangement and having a guard ring 66 surrounding the microcells 64.

In various embodiments, a plurality of signal traces 68 (such as a first set of signal traces) provides connection to the microcells as shown in FIG. 5. It should be noted that all of the signal traces 68 are not necessarily shown. As should be appreciated, as the signal traces 68 get longer when a pixel defined by the anode of the SIPM 62 gets larger (to reduce the number of channels), the inductance and resistance increases and the rise time of the signals increase (resulting also in an increase in the measured time of the gamma ray interaction and the variance of that measured time).

It should be noted that the signal traces 68 may be formed from any suitable material. For example, in one embodiment, the signal traces 68 are formed from aluminum and have a thickness of about 2 microns.

Additionally, in the embodiment of FIG. 5, a plurality of spaced apart signal traces 72 (such as a second set of signal traces) extend transvers (e.g., perpendicular) to the signal traces 68. It should be noted that although five signal traces 72 are illustrated, more or less signal traces 72 may be provided as desired or needed, for example, based on the size of the SIPM 62. For example, the signal traces 72 may be positioned periodically, such as between a number of the microcells 64 (such as every 8-10 microcells 64 along the x-axis). As used herein, periodically may mean having an even spacing or an uneven spacing therebetween. The signal traces 72 in various embodiments are thicker than the signal traces 68. For example, in the illustrated embodiment, the signal traces have a thickness of about 8 microns. However, the signal traces 72 may be thicker or thinner, such as 10-20 microns or 50 microns. It should be noted that the signal traces described herein may be any type of conductive trace.

In operation, signals in the signal traces 68 are combined in the x-direction at each of the signal traces 72. Thus, for example, the signals from the microcells 64 between the signal traces 72a and 72b travel to the signal traces 72a and 72b (the fraction of the signal traveling to the signal traces 72a and 72b depends on the position of the microcell 64), the signals from the microcells 64 between the signal traces 72b and 72c travel to the signal traces 72b and 72c, the signals from the microcells 64 between the signal traces 72c and 72d travel to the signal traces 72c and 72d and the signals from the microcells 64 between the signal traces 72d and 72e travel to the signal traces 72d and 72e. Thus, in various embodiments, the signal travels through a particular trace depending on the distance of the microcell 64 from the trace (e.g., signal travels to the closer trace). However, it should be appreciated that the signal flow through the signal traces 68 may be different (such as in the x-direction) so that the signals may be distributed among different ones of the signals traces 72. Accordingly, the signal traces 72 are connected to the signal traces 68 such that the signal traces 72 in various embodiments form signal buses that communicate the signals from the microcells 64 to an end or edge of the SIPM 62. For example, the signals received from the microcells 64 may travel left or right in the x-direction along the signal traces 68 and then down in the y-direction (as viewed in FIG. 5).

Thus, a signal path is provided such that signals from the microcells 64 travel in the x-direction along the signal traces 68 and then in the y-direction along the signal traces 72. The signal traces 72 are connected to a signal trace 74 (e.g., a summing signal trace), illustrated at the bottom of the SIPM 62 in FIG. 5. Accordingly, after the signals are combined in the x-direction, namely from each of the signal traces 68, the signals are communicated through the signal traces 72 (e.g., aluminum traces) to the signal trace 74 (e.g., aluminum trace). The signal trace 74 combines the signals that were previously combined by the signal traces 72. For example, the signal trace 74 may be configured as a summing line for the signals received from the signal traces 72. The signal trace 74 in various embodiments is also thicker than the signal traces 68 and may be thicker than the signal traces 72. For example, in one embodiment the signal trace 74 may be 100 microns thick. However, the signal trace 74 may be thicker or thinner. It also should be noted that a signal trace 73 may be provided along the top of the SIPM 62 as viewed in FIG. 5, which also may be thicker than the signal traces 72 in various embodiments. Thus, the embodiment of FIG. 5 may include the signal traces 73 and/or 74 along the top or bottom of the SIPM 82 such that the current from the microcells near the top of the SIPMs 82 can travel along and across the top of the anode in the signal trace 73 to the other traces 72 and then down (as viewed in FIG. 5) to the signal trace 74.

It should be noted that the signal traces 68, 72, 74 may be formed in any manner and using any suitable material. For example, in some embodiments the signal traces 68, 72, 74 are aluminum traces formed by a metal deposition process on a Silicon device (e.g., silicon wafer), such as using a complementary metal-oxide-semiconductor (CMOS) process. In some other embodiments, other metals, such as gold (or thicker traces) can be used to reduce the impedance and inductance of a trace. Additionally, the signal traces 68, 72, 74 may be interconnected using any suitable process.

Thus, the signal traces 72 may combine the signals in the y-direction as viewed in FIG. 5. It should be noted that the combining of the signals from the signal traces 68 or 70 may be provided using any suitable signal combining technique, such as at signal nodes along the ends of the signal traces.

The signal trace 72 is connected to a pin-out 76 (as shown in FIGS. 3 and 5). The pin-out 76 (e.g., a signal collection pad) may include a wire bond as shown in FIG. 3. As can be seen, the wire bond lengths for each of the pin-outs 76 for the SIPMs 62 are shorter and have the same or substantially the same length. Accordingly, the transit time for signals through each wire bond is the same. Thus, in various embodiments, multiple summing points may be provided to shorten the travel time of signals from the microcells 64. It should be noted that the pin-outs 76 may be wire bonded to a printed circuit board (PCB).

Figure 6:
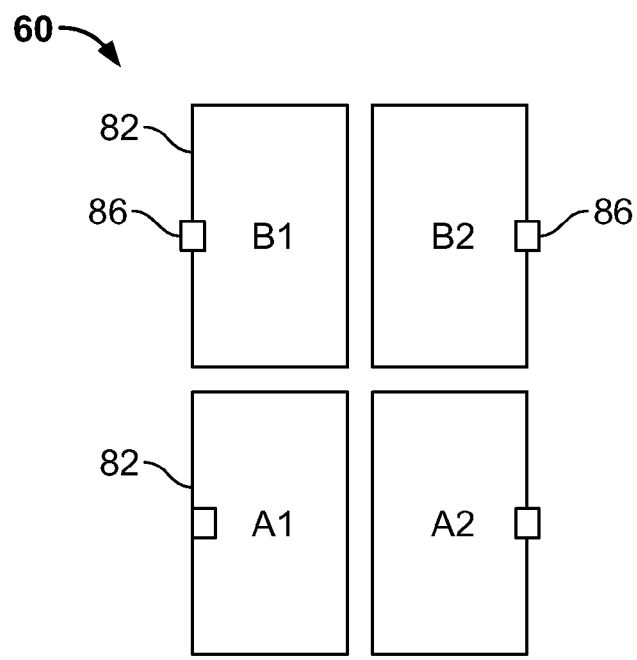
FIG. 6 is a schematic block diagram of Silicon photomultipliers (SIPMs) in accordance with another embodiment.
Figure 7:
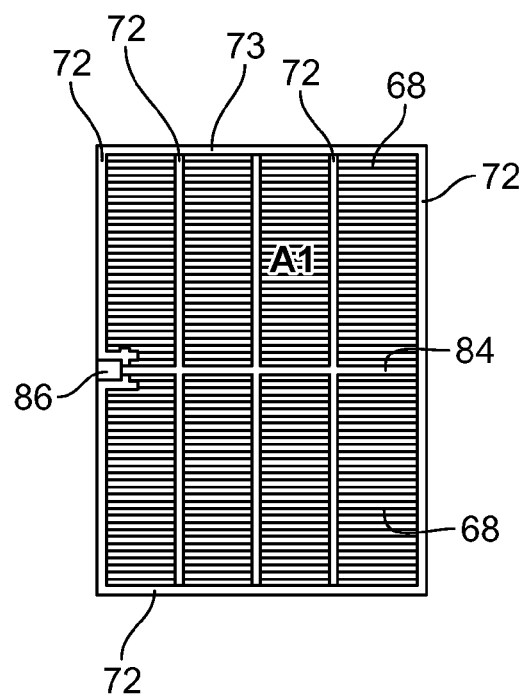
FIG. 7 is a diagram illustrating a signal trace arrangement in accordance with another embodiment.

Other configurations in accordance with various embodiments are shown in FIGS. 6-9. It should be noted that like numbers represent like parts in the various embodiments. In this embodiment, a plurality of SIPMs 82 include the signal traces 68 and 72 that form a signal path similar to the signal path of the SIPMs 62 illustrated in FIGS. 3-5. However, in the embodiment of FIGS. 6-8, instead of the signal trace 74 forming a summing line at the bottom of the SIPM 62, a signal trace 84, which is between the top and bottom of the SIPM 82 (as viewed in FIG. 7) is provided and a signal trace 72 is provided at the bottom of the SIPM 82 (as viewed in FIG. 7). The signal trace 84 also may be a summing line that is connected to a pin-out 86 (e.g., a signal collection pad). However, instead of being located at the bottom of the SIPM 82, the pin-out 86 is located along a side of the SIPM 82. Additionally, the signal trace 73 also may be provided, which may be the same thickness as the signal traces 72 or thicker than the signal traces 72. FIG. 6 generally illustrates a monolithic device wherein all of the anodes are on one silicon die. It should be noted that the monolithic device boundary is not shown in FIG. 6. It also should be noted that the wire-bonds or pad forming the pin-outs 86 (as well as the pin-outs 76 shown in FIGS. 3 and 5) in various embodiments are inside the anode, adjacent the anode, or slightly outside the anode area.

It should be noted that although the signal trace 84 is illustrated at about the middle (from top to bottom) of the SIPM 82, the signal trace 84 may be positioned at a different point along the SIPM 82 that is not centered. For example, the signal trace 84 forms a summing line that may be located to optimize signal path impedance/inductance. It also should be noted that the signal trace 84 may be thicker than the signal traces 68 and may be thicker than the signal traces 72.

Thus, in the embodiment of FIGS. 6-9, the wire bonding site for the pin-out 86 may be located along an edge or within the SIPM 82 to provide a shortest signal path from each of the microcells 64. In the illustrated embodiment of FIGS. 6 and 7, the pin-out 86 is located on the longer side of the rectangular shaped SIPM 82.

Figure 8:
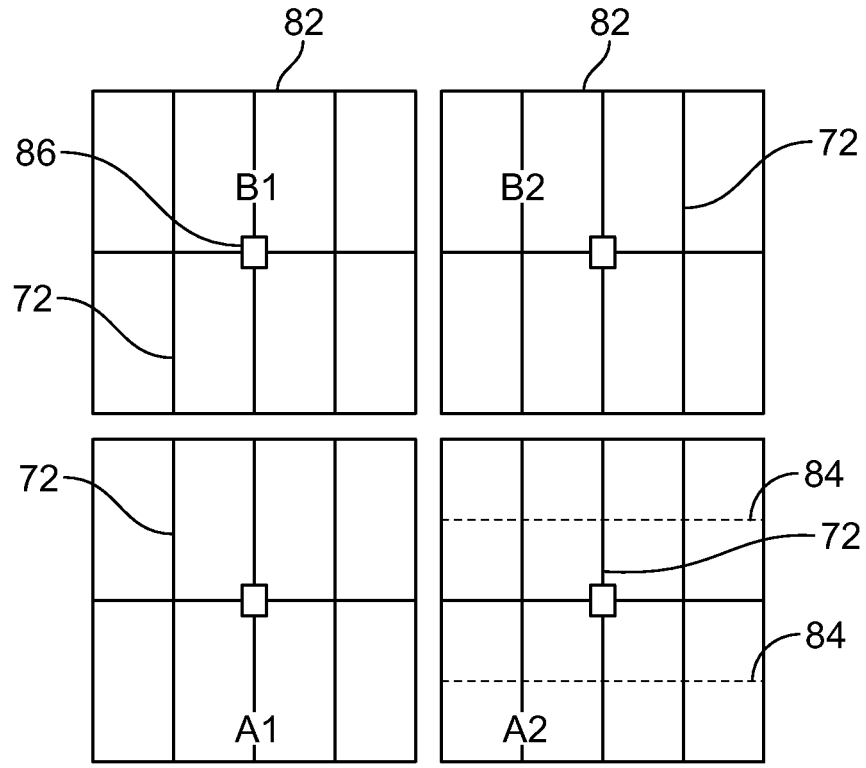
FIG. 8 is a schematic block diagram of Silicon photomultipliers (SIPMs) in accordance with another embodiment.

It should be noted that if through-via technology is used, such that vias are provided through the SIPMs 82, the pin-outs 86 may be provided in a middle of the SIPMs 82 as shown in FIG. 8 in order to reduce the signal travel length difference from all the microcells 64. For example, the pin-outs 86 may be connected to vias and the vias bump bonded to a PCB board. As can be seen, the middle position of the anode provides an equal or the same travel length for the microcells 64 in the far corners of the SIPM 82 (e.g., to collect the signals to the middle of the SIPM 82 faster). For example, in various embodiments, the signal trace 84 may be provided and connected to the middle pin-out 86. Additionally, it should be noted that additional horizontal signal traces 84 optionally may be provided, for example, as shown in dashed lines in the A2 SIPM 82. These additional signal traces 84 may be provided in various embodiments in all of the microcells 64 and is shown in a single microcell 84 for illustration. Also, additional or fewer signal traces 84 may be provided, such as parallel to the illustrated to the signal traces 84, which may be evenly or unevenly spaced apart. It should be noted that in some embodiments the signal traces 84 are thicker than the signal traces 72 as described in more detail herein.

It also should be noted that the embodiments described in FIGS. 3-7 can also have through vias instead of wire-bonds. In the embodiment of FIG. 8, the SIPMs 82 are generally square in shape. However, other shapes may be provided. It should be noted that embodiments illustrated in FIGS. 3-7 may alternatively include through vias instead of wire-bonds.

Figure 9:
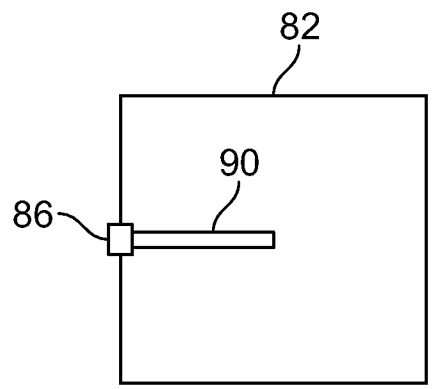
FIG. 9 is a schematic block diagram of Silicon photomultipliers (SIPMs) in accordance with another embodiment.

Additionally, if there are no vias, signal summation may still be performed at a middle of the SIPM 82 as shown in FIG. 8. However, in this embodiment, in order bring the signal out to the edge of an anode, a signal line 90 may be provided from the middle of the SIPM 82 to the edge of the SIPM 82 as shown in FIG. 9.

It should be noted that the SIPMs may be formed using any known SIPM fabrication process in the art, which may be based on the particular configuration or operating characteristics of the SIPM.

It also should be noted that various embodiments may be used with different types of devices. For example, various embodiments may be implemented with a single diode device (or a discrete device). However, various embodiments may also be implemented with a monolithic device having two or more anodes on the same die.

Thus, in accordance with various embodiments, signal summing is located such that the signal path may be improved or optimized for impedance/inductance. Accordingly, in some embodiments a more uniform transit time and signal integrity may be provided. Additionally, in various embodiments, by using thicker signal lines, a non-uniformity of the signal path may be reduced while keeping fill factors the same or increased.

Figure 10:
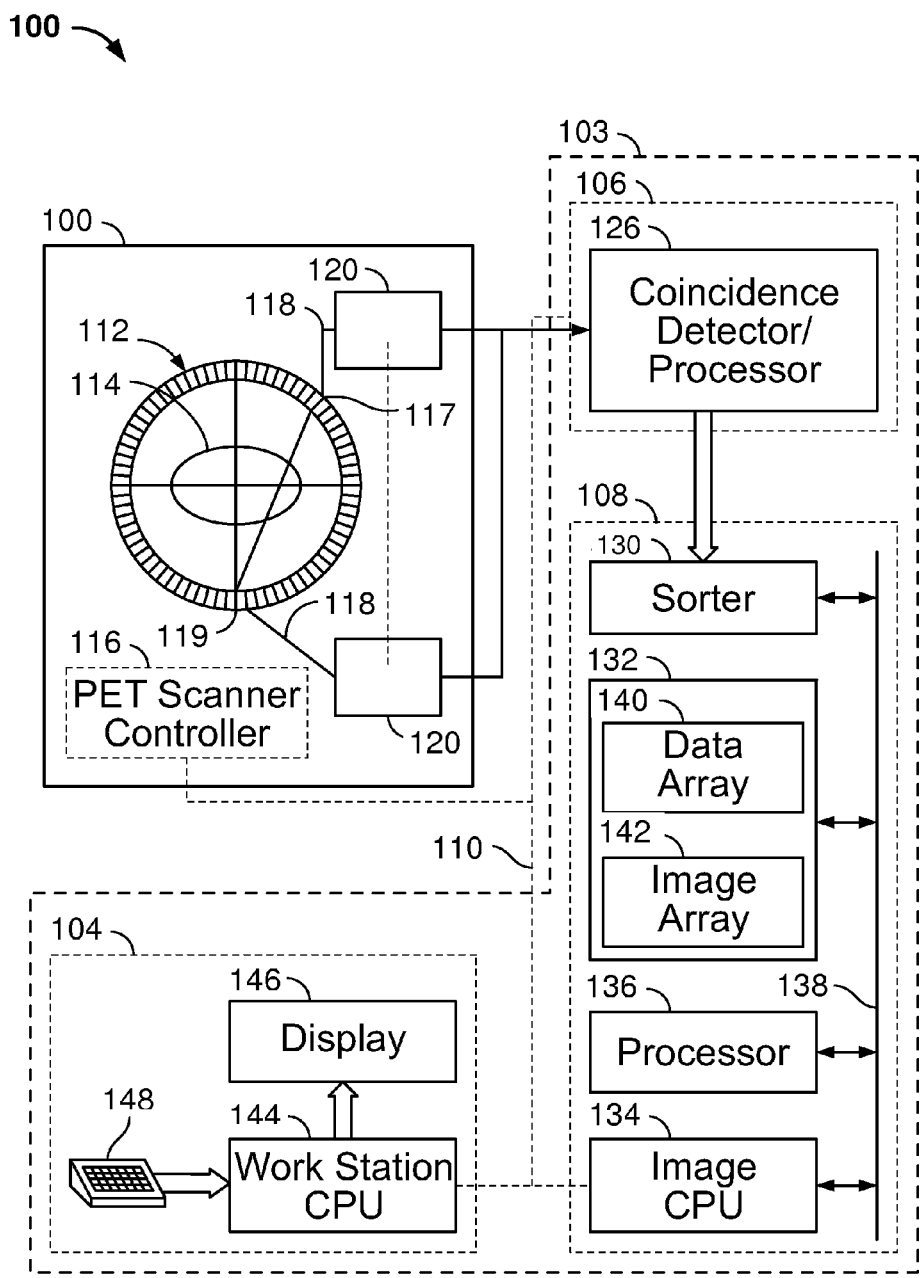
FIG. 10 is a diagram of a PET system in accordance with an embodiment.

FIG. 10 is a block diagram of an exemplary embodiment of a PET system 100 in which various embodiments of the invention may be implemented. The PET system 100 includes a PET scanner 101 and a controller 103 to control image reconstruction processes. The controller 103 includes an operator workstation 104 and a processor 105. The processor 105 includes a data acquisition processor 106 and an image reconstruction processor 108. The PET scanner 101, operator workstation 104, data acquisition processor 106 and image reconstruction processor 108 are interconnected via a communication link 110 (e.g., a serial communication or wireless link). The PET scanner 101, which typically includes a gantry (not shown), acquires scan data and transmits the data to the data acquisition processor 106. The operation of the PET scanner 101 is controlled from operator workstation 104. The data acquired by data acquisition processor 106 is reconstructed using image reconstruction processor 108.

The PET scanner 101 may operate, using, for example, a plurality of detector rings. One such detector ring, detector ring 112, is illustrated in FIG. 10, which may be embodied as the detector ring assembly 20 (shown in FIG. 1) that includes SIPMs formed in accordance with various embodiments. The detector ring 112 includes a central opening, in which an object 114 (e.g., a patient) may be positioned, using, for example, a motorized table that is aligned with the central axis of the ring 112. The motorized table moves the object 114 into the central opening of the ring 112, in response to one or more commands received from operator workstation 104. A PET scanner controller 116, also referred to as a gantry controller, is provided (e.g., mounted) in the PET scanner 101. The PET scanner controller 116 responds to the commands received from the operator workstation 104 through the communication link 110. Therefore, the operation of the PET scanner 101 is controlled from the operator workstation 104 through the PET scanner controller 116.

The detector ring 112 includes a plurality of detector elements for performing a PET scan of the object 114. For example, there may be 420 crystals per ring and 24 rings in the scanner. As shown in FIG. 10, the detector ring 112 includes a first detector element 117, a second detector element 119, and several other detectors. It should be noted that the detector elements are referred to as the first detector element and the second detector element, only to differentiate location in FIG. 10. The first detector element 117, like the other detectors, includes a set of scintillator crystals arranged in a matrix that is disposed in front of a plurality of photosensors (e.g., the light sensors 34) as described in more detail herein. When a photon impinges on a crystal on a detector, the photon produces a scintillation in the crystal. Each photosensor produces an analog signal on the communication line 118 when a scintillation event occurs. A set of acquisition circuits 120 is provided within the PET scanner 201 to receive these analog signals. The acquisition circuits 120 include analog-to-digital converters to digitize analog signals, processing electronics to quantify event signals and a time measurement unit to determine time of events relative to other events in the system. For example, this information indicates when the event took place and the identity of the scintillation crystal that detected the event. The acquisition circuits produce digital data indicating the location, time and total energy of the event. This event data is transmitted through a communication link, for example, a cable, to a coincidence detector or processor 126.

The coincidence detector 126 receives the event data packets from the acquisition circuits 120 and determines if any two of the detected events are in coincidence. In this context, the coincidence is determined by a number of factors. First, the time markers in each event data packet must be within a predetermined time period, for example, 6 ns, of each other. Secondly, the LOR formed by a straight line joining the two detectors that detect the coincidence event should pass through the field of view in PET scanner 101. Events that cannot be paired are discarded. Coincident event pairs are recorded as a coincidence data packet that is communicated through a communication link to a sorter 130 in the image reconstruction processor 108.

The image reconstruction processor 108 includes the sorter 130, a memory module 132, an image CPU 134, an array processor 136, and a back-plane bus 138. The sorter 130 counts all events that occur along each projection ray and organizes them into a coincidence data set. In one embodiment, this data set is organized as a data array 140, referred to as a sinogram. The data array 140 is stored in the memory module 132. The back-plane bus 138 is linked to the communication link 110 through the image CPU 134, which controls communication through the back-plane bus 138. The array processor 136 is also connected to the back-plane bus 138, receives the data array 140 as an input, and reconstructs images in the form of the image arrays 142. The resulting image arrays 142 are stored in the memory module 132.

The images stored in the image array 142 are communicated by the image CPU 134 to the operator workstation 104. The operator workstation 104 includes a CPU 144, a display device 146, and an input device 148. The CPU 144 connects to the communication link 110 and receives inputs (e.g., user commands) from the input device 148, which may be, for example, a keyboard, mouse, or a touch-screen panel. The operator can control the calibration of the PET scanner 101, the configuration of the PET scanner 201, and the positioning of the object 114 for a scan through the input device 148 and associated control panel switches. Similarly, the operator can also control the display of the resulting image on the display device 146 and perform image-enhancement functions, using programs executed by the workstation CPU 144.

The processor 105 is configured to process the scan data received from the detector elements. The scan data includes, for example, sinogram and timing information that is received by processor 105 from the detector elements during an imaging scan. The timing information in one embodiment is the difference in time at which two photons emitted in an annihilation event are detected by detector elements. The timing information may include time stamp information relating to a measured photon event detected by a pair of detector elements, for example, the first detector element 117 and the second detector element 119, for the PET system 100. The time stamp information is the time at which each photon is detected by a detector element, which in various embodiments.

The timing information is received by detectors, which include, for example, a block of 36 scintillator crystals attached to an array of photosensors. The scintillator crystals convert the incoming photon from the patient into a plurality (e.g., several thousand) of light photons (e.g., visible or near UV), which are detected by the photosensors. The proportion of light photons detected by each photosensor channel is used to determine which of the 36 crystals received the incoming photon. The timing signal is determined by processing the leading edge of the signals, to estimate the arrival of the light photons at the light sensors 34 of, for example, the SIPM. This timing signal is then digitized and processed subsequently.

The energy and timing information are used to reconstruct an image of the object 114, scanned by the PET system 100. The reconstruction may include, for example, a two-dimensional or three-dimensional reconstruction. The timing data of each detector element may be configured as a timing bias matrix with a timing recovery value for each set of projection rays of the PET system 100. It should be noted that a detector element pair detects the projection rays from a photon event.

The timing bias data of each detector element pair corresponding to the projection ray is stored in the memory module 132 of the PET system 100.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A gamma ray detector comprising:
   a scintillator block having a plurality of scintillator crystals; and
   a plurality of light sensors coupled to the scintillator crystals and having a plurality of microcells, each of the plurality of light sensors having,
      a first set of signal traces connected to the microcells;
      a second set of signal traces connected along the first set of signal traces and together forming a signal path to a summing signal trace, wherein the second set of signal traces are interposed between the first set of signal traces and the summing signal trace along the signal path, the second set of signal traces providing summed signals from the first set of signal traces to the summing signal trace; and
      a pin-out connected to the summing signal trace.

2. The gamma ray detector of claim 1, wherein the second set of signal traces are periodically spaced along the first set of signal traces between a plurality of microcells.

3. The gamma ray detector of claim 1, wherein the second set of signal traces are aligned transverse to the first set of signal traces.

4. The gamma ray detector of claim 1, wherein the second set of signal traces are thicker than the first set of signal traces.

5. The gamma ray detector of claim 1, wherein the second set of signal traces and the summing signal trace are both thicker than the first set of signal traces.

6. The gamma ray detector of claim 1, wherein the summing signal trace is located along an end of the second signal traces.

7. The gamma ray detector of claim 1, wherein the summing signal trace is located between ends of the second signal traces.

8. The gamma ray detector of claim 1, wherein the pin-out is located along the summing signal trace at an end of one of the signal traces of the second set of signal traces.

9. The gamma ray detector of claim 1, wherein the pin-out is located along the summing signal trace at an end of one of the signal traces of the first set of signal traces.

10. The gamma ray detector of claim 1, wherein the pin-out is located along the summing signal trace at an end trace of the second set of signal traces.

11. The gamma ray detector of claim 1, wherein the pin-out is located in a middle region of the light sensor.

12. The gamma ray detector of claim 11, further comprising an output signal trace from the pin-out to an edge of the light sensor.

13. The gamma ray detector of claim 11, further comprising a through via connected to the pin-out.

14. The gamma ray detector of claim 1, wherein the plurality of light sensors comprise one or more Silicon photomultipliers (SIPMs).

15. The gamma ray detector of claim 1, further comprising an output formed by a through-via.

16. A Position Emission Tomography (PET) system comprising:
    a plurality of gamma ray detector elements configured to acquire scan data, the detector elements having scintillator crystals with a plurality of lights sensors, the plurality of light sensors having a plurality of microcells, each of the plurality of light sensors having,
        a first set of signal traces connected to the microcells;
        a second set of signal traces connected along the first set of signal traces and together forming a signal path to a summing signal trace, wherein the second set of signal traces are interposed between the first set of signal traces and the summing signal trace along the signal path, the second set of signal traces providing summed signals from the first set of signal traces to the summing signal trace; and
        a pin-out connected to the summing signal trace.

17. The PET system of claim 16, wherein the second set of signal traces are periodically spaced along the first set of signal traces at between a plurality of microcells and aligned transverse to the first set of signal traces.

18. The PET system of claim 16, wherein the second set of signal traces and the summing signal trace are both thicker than the first set of signal traces.

19. The PET system of claim 16, wherein the summing signal trace is located along an end of the second signal traces.

20. The PET system of claim 16, wherein the summing signal trace is located between ends of the second signal traces.

21. The PET system of claim 16, wherein the plurality of light sensors comprise one or more Silicon photomultipliers (SIPMs).

22. The PET system of claim 16, further comprising wire bonds connected to the pin-outs, the wire bonds having a similar length wherein a transit time for signals through each wire bond is similar.

* * * * *